Jan. 14, 1969    F. W. R. STARP    3,421,427
PHOTOGRAPHIC CAMERA DIAPHRAGM SHUTTER

Filed March 3, 1966    Sheet _1_ of 3

INVENTOR
Franz W. R. Starp
BY
Amster & Rothstein
ATTORNEYS

INVENTOR
Franz W. R. Starp
BY
Amster & Rothstein
ATTORNEYS

United States Patent Office 3,421,427
Patented Jan. 14, 1969

1

3,421,427
PHOTOGRAPHIC CAMERA DIAPHRAGM
SHUTTER
Franz W. R. Starp, Calmbach, Black Forest, Germany, assignor to Prontor-Werk Alfred Gauthier G.m.b.H., Calmbach, Black Forest, Germany
Filed Mar. 3, 1966, Ser. No. 531,640
Claims priority, application Germany, Mar. 11, 1965, P 36,258
U.S. Cl. 95—63                    6 Claims
Int. Cl. G03b 9/14

The present invention concerns a photographic diaphragm shutter with an aperture setting member adapted to be adjusted by hand to different predetermined aperture and time values, the shutter blades covering the lens opening swing out during exposure from the closed position to a width of aperture corresponding to the preselected aperture value.

In shutters of this kind it is known to arrange an additional gearing between the driving member of the shutter drive and the shutter blades, by means of which the normally constant path of the driving member is controlled to produce shutter blade openings varying in size. Such gears are costly and turn a diaphragm shutter into a complex mechanism which is therefore prone to breakdowns; in addition the accommodation of such a mechanism in a space already restricted, is made particularly difficult.

The object of the invention is to eliminate the disadvantages of known diaphragm shutters, and to produce a shutter arrangement whereby special gearing serving to vary the swingout width of the shutter blades is omitted.

According to the present invention there is provided a photographic camera diaphragm shutter with an aperture setting member adapted to be set by hand to various predetermined aperture values, the shutter blades covering the lens opening, during exposure swinging out to an opening width corresponding to the preselected aperture value, in which the shutter blades are driven by means of a permanent magnet displaceable with the shutter blade system interacting with an electromagnet having a polarity which is reversible by means of an electronic switching device in timed dependence, the two poles of the electromagnet having a variable separation determining the effective aperture.

According to a further feature of the invention provision is made for the pole separation to be adjustable by means of the aperture setting member or a transmitting member adapted to be influenced thereby. This permits a rapid, reliable and simple adjustment of the pole separation of the electromagnet, since the pole separation is simultaneously adjusted with the selection of the aperture value so that a separate setting member is no longer required. Concerning the construction of the electromagnet, provision is made in accordance with the invention for a pole of the electromagnet against which one pole of the permanent magnet is located in the open position of the shutter blades, to be displaced and formed as a yoke. The displaceable yoke of the electromagnet may support an engaging pin which engages in a control slit of the aperture setting member. This arrangement is suitable for diaphragm shutters in which the aperture setting member is located away from the optical axis of the shutter. If on the other hand the aperture setting member is arranged concentrically relative to the optical axis, then it may be preferable for the displacement yoke of the electromagnet to be connected with a fixedly mounted intermediate lever which is pivoted by means of a control projection of the aperture setting member.

A further feature of the invention is that the electronic switching device has a contact switch serving to simultaneously energise the electromagnet and an electrical time delay circuit.

2

To improve the electronic switching device to provide a simple and rapid operation of the camera it is proposed moreover for the time delay control to be moved by the exposure time setting member.

The invention will be described further by way of example, with reference to the accompanying drawings, in which.

Figure 1:
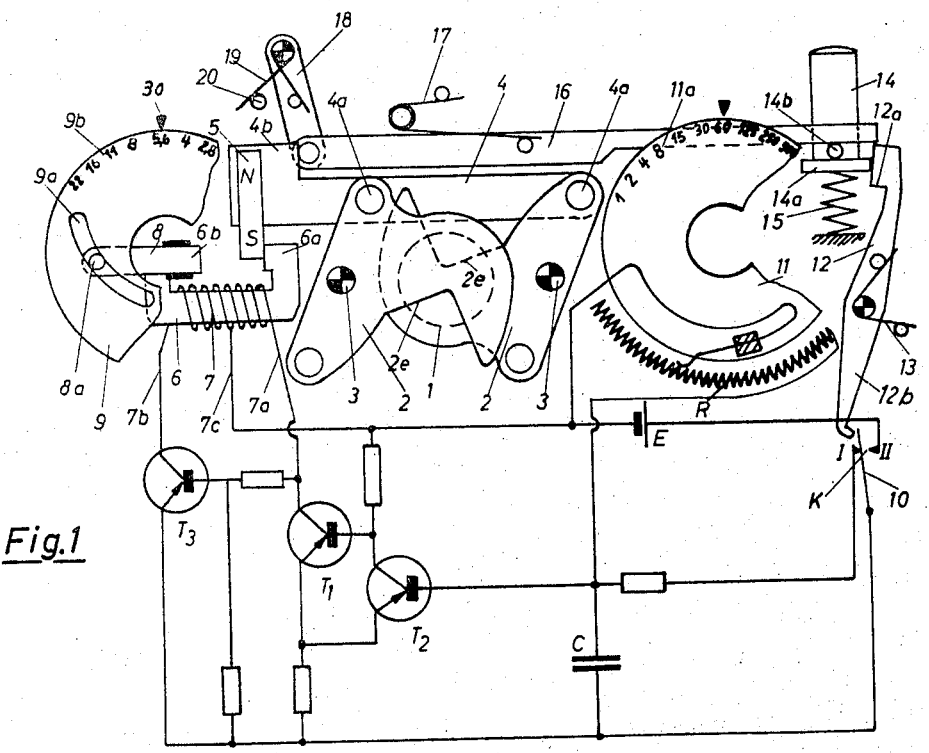
FIG. 1 is a schematic illustration of a diaphragm shutter controllable by means of an electronic switching device, having two shutter blades shown in the inoperative position and interconnected by means of an electromagnetically actuated connecting rod.

The numeral 1 designates the shutter opening in the base plate of a photographic lens shutter, which for the sake of clarity is not illustrated in greater detail. The shutter opening 1, is covered by two identical shutter blades 2, each of which is rotatably mounted on a fixed pin 3. To impart a reciprocating exposing movement, each shutter blade 2 is journalled by means of a pin 4a on a driving coupling rod 4. The pins 4a are equidistantly arranged from one another like the bearing pins 3, causing a parallelogram to be formed. The arrangement and construction of the shutter blades 2 is preferably such that when moving the coupling rod 4 from one end position to the other and vice versa, the shutter blades rotate in the same direction whereby, owing to the special configuration of the inner shutter blade edges 2e, square or substantially square aperture openings are formed.

Figure 2:
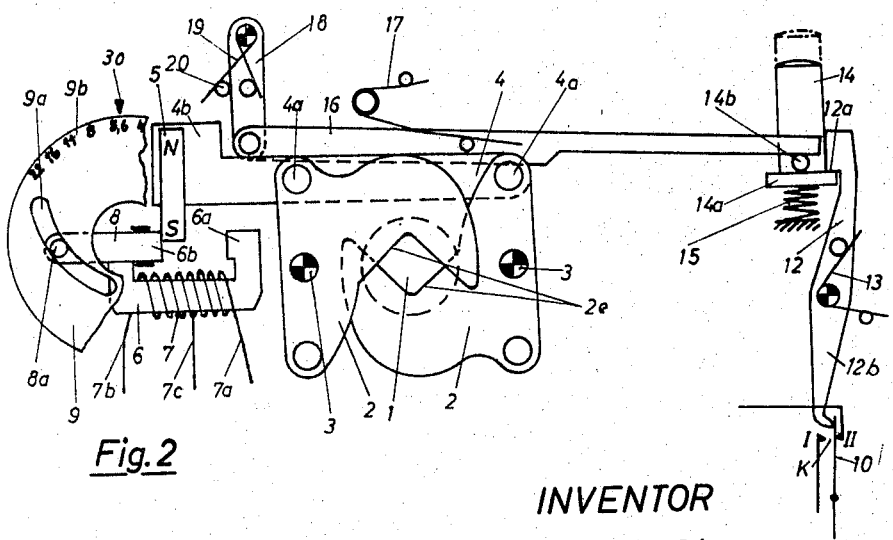
FIG. 2 shows the diaphragm shutter in the open position.

An electro-magnetic driving system acting on the coupling rod 4 is used for opening and closing the shutter blade 2. The driving system has a permanent bar magnet 5 which co-operates with an electromagnet, arranged on the shutter base plate (not shown) which magnet is formed by a U-shaped iron core 6 and a magnet coil 7. The arrangement is such with reference to the permanent magnet 5 that the latter projects with its free end formed, for example, as a south pole into the field of force lines of the electro-magnet 6, 7. In the closed position of the shutter blades 2 this free end, as shown in FIG. 1, assumes a position at the pole 6a of the electromagnet 6, 7. In the open position, as shown in FIG. 2, it lies against the pole 6b. When the electromagnet 6, 7 is de-energized, the permanent magnet 5, because of its own magnetic field, adheres to the pole of the electro-magnet by which it is first attracted or to which it is applied by hand. This conditionally is the pole 6a, because abutment against this pole corresponds to the closing position of the shutter blades 2. As further stated below, the permanent magnet 5 is also reinforced in its retention by the electromagnet 6, 7, which has its north pole in the pole 6a as shown.

The above described electromagnetic drive of the shutter blades enables the shutter blades to be used to form the required aperture. For this purpose, as further evident from the drawing, the pole 6b against which the permanent magnet 5 in the open position of the shutter blades strikes, is arranged to be displaceable relative to the other pole 6a of the electromagnet 6, 7, this pole being formed as a yoke 8. The yoke 8 is reciprocated by means of an aperture setting member 9 coupled thereto by means of a pin and slot connection 8a, 9a. This setting member is adjustable by means of a diaphragm scale 9b and mark 30. In accordance with the selection of the aperature value the oppositely disposed poles 6a and 6b of the electromagnet 6, 7 are adjusted to a certain distance. If, for example, the aperture value 2.8 is selected, then the distance between the poles 6a and 6b is at its maximum, with the result that the shutter blades 2 during exposure swing out fully and hence the full lens opening 1 exposed. If on the other hand by means of the aperture setting member 9 the aperture 22 is selected, then the pole distance is so reduced that the shutter blades during exposure swing out only enough to form an opening corresponding to the adjusted aperture value.

The magnet coil 7 of the electromagnet 6, 7, with connections 7a and 7b, has a tap 7c between these latter which divides the magnet coil into two winding sections 7a–7c and 7b–7c. Connected to the said connections is an electronic switching device conveniently formed as a toggle action, connected to a source of energy E by means of a contact switch K. Components of the switching device are a rheostat R, a capacitor C and transistors $T_1$, $T_2$ and $T_3$. Transistor $T_1$ and the winding section 7a–7c of the magnet coil 7, are connected in series with the contact switch K, which is formed of two fixed contact points 1 and 11 and a blade 10 reciprocated between them. The capacitor C, connected to the second transistor $T_2$, and the rheostat R are provided in a separate circuit. The rheostat and the capacitor C form a delay circuit. The value of the ohmic resistance of the rheostat R is variable by means of a time setting member 11 which supports a scale 11a for setting different exposure times. Parallel to the afore-mentioned circuit containing the RC member, a further transistor $T_3$ is so connected to the winding section 7b–7c of the magnet coil 7 that the collector current of this transistor enters the coil at the connecting point 7b and leaves it at the tap 7c. The remaining resistor which is not further designated in the wiring serves to complete the above described electronic switching device.

As further illustrated in FIGS. 1 and 2, the actuation of the contact switch K is effected by means of a contact lever 12, which is pivotally mounted and biased by a spring 13 against a push button 14. The push button 14 is displaceable against the action of a compression spring 15 and is provided for this purpose with a collar 14a which simultaneously serves to lock the contact lever 12 in the release position. The contact lever 12 is associated with an actuating device interconnecting the driving mechanism of the shutter blades 2 and the contact lever. This device is to ensure the push button 14 does not act on the contact switch K for a longer period than is required, i.e. it causes a contact break at the end of the shutter movement. This effect is achieved by means of a connecting rod 16 which at one point is biased by the action of a coil spring 17, and rests against a pin 14b of the push button 14. At its end the connecting rod 16 is pivoted on a rocker arm 18 which is biased by a spring 19 and is supported in the closing position of the shutter against the shoulder 4b of the coupling rod 4. The movement of the rocker arm 18 following the opening movement of the driving rod is limited by means of a stop 20.

The operation of the shutter described above is as follows:

When setting the diaphram by means of the diaphragm setting member 9 to the required value, the magnet yoke 8 of the lectromagnet 6, 7 is displaced to the left or right with reference to FIG. 1 by means of the pin and slot connection 8a, 9a, whereby the two poles 6a and 6b of the electromagnet are moved to a corresponding distance apart. The time constant of the RC member i.e. the ohmic value of the rheostat R, is set by selecting the exposure time by means of the setting member 11. If the pushbutton 14 is now actuated to release the shutter, the stop edge 12a of the contact lever 12 resting against the pushbutton, drops into engagement behind the collar 14a. This, locks the push button 14 and produces rotation of the contact lever 12 in an anti-clockwise direction. The lever arm 12b facing the contact switch K causes the blade 10 to engage the contact point II. This causes a current to flow from the source of energy E via the transistor $T_1$ through the connecting point 7a into the winding section 7a–7c of the magnet coil 7 and back again via the tap 7c. The transistors $T_2$ and $T_3$ are still suppressed, whilst in the electromagnet 6, 7 a magnetic field is built up which has its south pole in the pole 6a and its north pole in pole 6b. Under the influence of this field the permanent magnet 5, the south pole (S) of which up to now adhered to to pole 6a, is suddenly repelled therefrom and at the same time attracted by the pole 6b, the coupling rod 4 connected to the permanent magnet changing over from the closed position shown in FIG. 1 into the open position in accordance with FIG. 2. This movement is followed by the rocker arm 18 with the connecting rod 16 biased by the spring 19, until it rests against the stop pin 20. The free end of the connecting rod 16 now assumes the position shown in FIG. 2.

Closing of the contact switch K simultaneously causes the condenser C to commence charging. The time required by the condenser to attain the voltage which unbiases the transistor $T_2$, is dependent upon the capacity of the condenser and the ohmic value of the rheostat R. When this voltage is reached, the transistor $T_2$ becomes conductive. This in turn results in transistor $T_1$ being shut off and transistor $T_3$ to become conductive. In the electromagnet 6, 7 current now flows from the connecting point 7b through the winding section 7b–7c in a direction opposite from the former current. The result of this is that at the pole 6b of the electromagnet 6, 7 a south pole and at pole 6a a north pole is formed. Consequently the permanent magnet 5 has its south pole repelled from the pole 6b of the electromagnet 6, 7 and at the same time attracted by the pole 6a, the coupling rod 4 being moved and the shutter blades returned to the closing position as shown in FIG. 1, in which the permanent magnet adheres anew to the pole 6a of the electromagnet. As already explained above, the push button 14 has been locked in the release position by the contact lever 12, but is now unlocked by the shutter mechanism since, when changing over the driving coupling rod 4 from the open into the closed position, the rocker arm 18 and the connecting rod 16 secured thereto are displaced to the right with reference to FIG. 2. In this case the free end of the connecting rod 16 strikes against the contact lever 12, swinging the latter against the action of the spring 13. The contact switch K now opens and breaks the circuit of the electronic switching device. If the push buttom 14 is now released unless this has already previously occurred, it returns to the original position shown in FIG. 1, under the action of the compression spring 15. The actuating device described above eliminates disturbances of the shutter caused by faulty operation of the push button 14 in releasing the shutter. A satisfactory functional cycle of the electronic switching device is ensured, and unnecessary loading of the source of energy avoided.

The rheostat R, as indicated already above, permits the period of time for charging the condenser C and hence the opening period of the shutter blades 2 to be varied in known manner. Instead of the rheostat R, adjusted by means of the exposure time setting member 11, a photoelectric resistance can be used if it is intended to determine the exposure time automatically in dependence upon the prevailing light conditions. In this case a variable capacitor C is used, with means determining the capacitance thereof by the aperture setting member 9, so that allowance is made for the preselected aperture in determining the exposure time automatically. Furthermore a film sensitivity setting member could be superposed on the aperture setting member 9.

Figure 3:
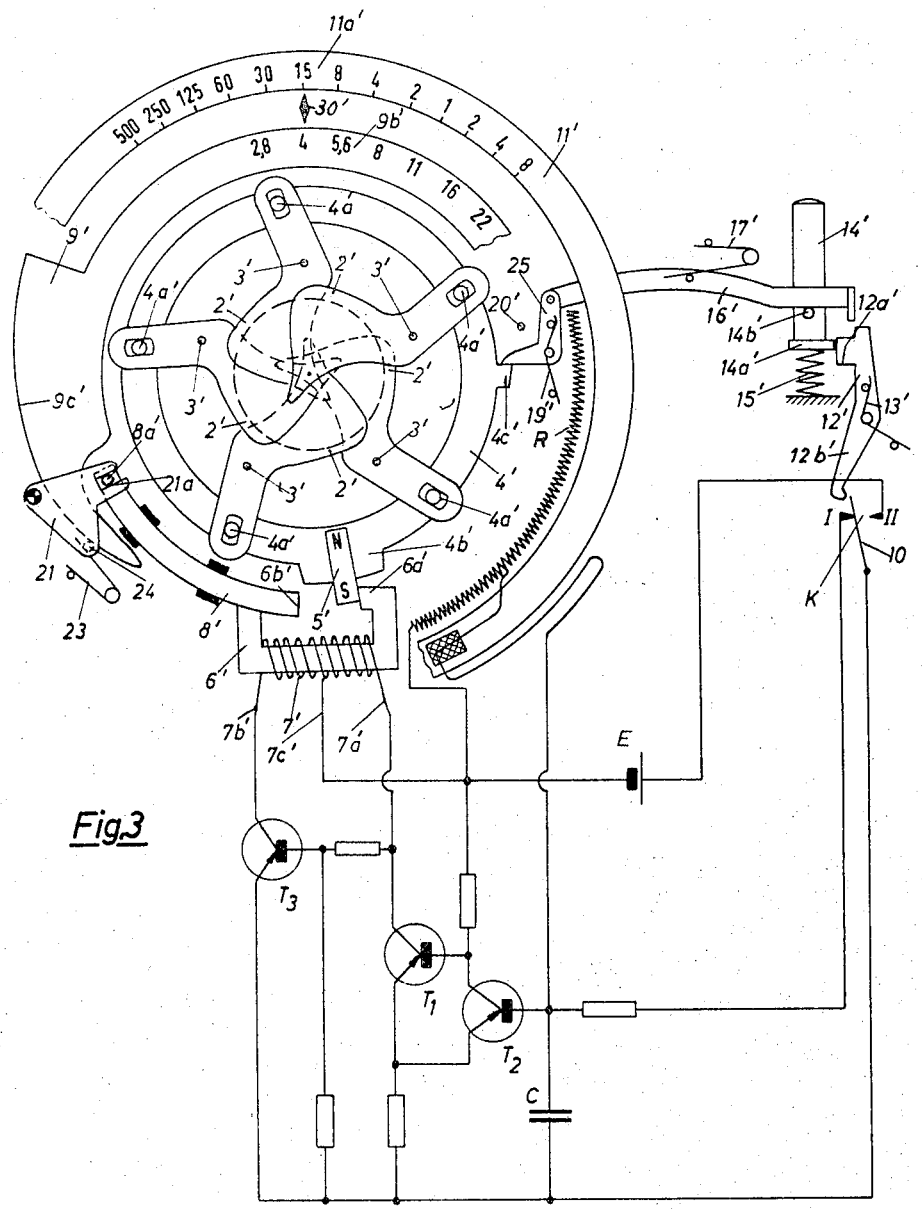
FIG. 3 shows a shutter arrangement controlled in the same manner as the arrangement of FIG. 1 but having five shutter blades for the actuation of which a shutter blade actuating ring driven electro-magnetically is provided, and shown in the closing position.
Figure 4:
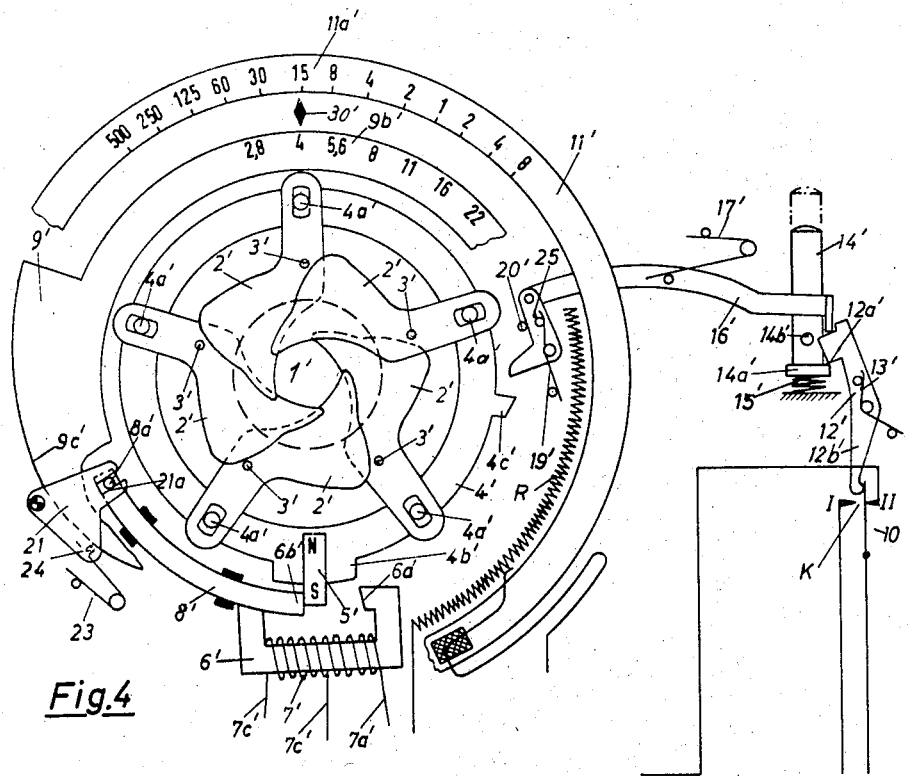
FIG. 4 shows the shutter arrangement of FIG. 3 in the open position.

In accordance with FIGS. 3 and 4, an electromagnet with reversible polarity may also be used in an electromagnetic driving system for driving more than two, for example, five shutter blades. In this shutter arrangement the parts which correspond to those of the arrangement as shown in FIGS. 1 and 2 are indicated by the same reference numerals provided additionally with a dash. In the shutter arrangement according to FIGS. 3 and 4 the shutter blade actuating ring 4' arranged concentrically with the optical axis of the lens is used as a common driving member for the shutter blades 2'. On the shoulder 4b' of the ring a permanent magnet 5' is so mounted with reference to the fixedly mounted electromagnet 6', 7' that the free end of the permanent magnet may reciprocate between the poles 6a' and 6b' of the electromagnet. The setting member for aperture and time 9' and 11', are arranged concentrically with the optical axis. The magnet yoke 8' of the electromagnet 6', 7' is arcuate and is guided by means not shown. The magnet yoke 8' is displaced and retained by a pivotally mounted intermediate lever 21 which at one end is in engagement with the yoke by means of an articulation 8a', 21a, and at the other end is held by a spring 23 and a pin 24 against a cam 9c' formed on the aperture setting member 9'. The connecting rod 16' is journalled to an angle lever 25 which is held in the closed position under action of the spring 19' against a further extension 4c' of the shutter actuating ring 4', and in the open position against the stop pin 20'.

The mode of operation of the shutter shown in FIGS. 3 and 4 corresponds in principle to the operation of that shown in FIGS. 1 and 2. When setting the aperture value, the magnet yoke 8' is caused to assume and is retained in a predetermined position corresponding to the aperture value with reference to the fixed opposite pole 6a' of the electromagnet 6', 7' by means of the cam controlled intermediate lever 21. Opening and closing the shutter blades 2' is effected by the magnetic system, time-controlled by means of the delay circuit, in the same manner as already described in detail with reference to the shutter shown in FIGS. 1 and 2.

Figure 5:
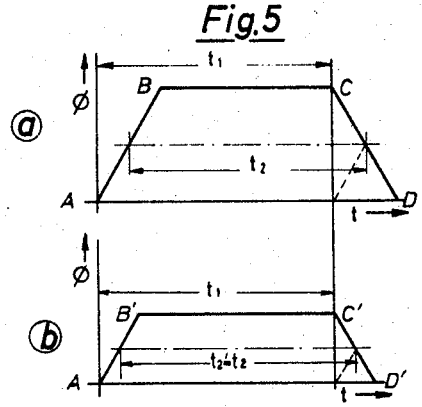
FIGS. 5 and 6 are diagrams showing the time-aperture characteristics of a shutter constructed in accordance with the invention.

During the exposure sequence the above described shutter arrangement result in an aperture-time graph which for full aperture has the form shown in FIG. 5a and defined by A, B, C and D. The diagonally ascending line A–B represents the opening period, the horizontally extending line B–C the fully-open period and the descending line C–D the closing period of the shutter. The exposure time set by the exposure time setting member 11 or 11' is designated by $t_1$ and is shown above the graph A-B-C. As already stated, when the pushbutton 14 or 14' is actuated, the electromagnet 6, 7 or 6' is energised and the capacitor C commences charging. The time delay of the electronic switching device thus commences at the instant at which the shutter blades 2 or 2' begin to open. At point B of the graph FIG. 5a the permanent magnet 5 or 5' has arrived at the pole 6b or 6b' of the electromagnet and the shutter blades 2 or 2' now produce full aperture. On expiration of the period $t_1$, which corresponds to point C in FIG. 5a, the capacitor C in the delay circuit has reached the basic potential of the transistor $T_2$, whereby the latter, as explained above, is rendered conductive and the polarity of the electromagnet is reversed. This results in the return of the permanent magnet to the starting pole 6a or 6a', corresponding to point D in FIG. 5a. The time interval $t_1$ set by the exposure time setting member 11 or 11' thus includes the whole of the opening and the open periods of the shutter, whilst the closing period corresponding to the line C–D is not included. Opening and closing periods in the above-described shutter arrangement may be made equal to one another since both during opening and closing of the shutter, identical masses have to be displaced by the same force over the same distance i.e. the lines A–B and C–D projected on the time axis of the opening time graph are identical with one another. To find the effective time $t_2$ from this graph, the conventional method, in which each half-time of opening and closing times is added to the open time, may be replaced by adding the whole amount of opening time, A–B to the open time B–C, whilst the closing time may be disregarded. As a result it is shown that in accordance with the graph FIG. 5a the exposure time $t_1$ set by the exposure time setting member 11 or 11' corresponds to the effective exposure time $t_2$.

If whilst maintaining the exposure time $t_1$ the aperture is reduced, then the diagram shown in FIG. 5b is obtained. In this illustration the lines A'–B' for the opening time and C'–D' for the closing time extend parallel to the graphs A–B and C–D in FIG. 5a. Since the sum predetermined by the exposure time $t_1$ of opening and closing times is identical in both cases, then the effective time $t_2'$ in the diagram of FIG. 5b is also identical with the exposure time $t_1$ set, i.e. for a certain exposure time $t_1$ the effective time $t_2$ remains constant and independent of the effective aperture.

Figure 6:
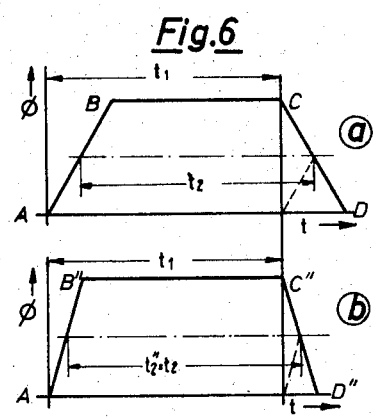

In diaphragm shutters in accordance with the invention this effective time $t_1$ is also the same if the shutter has a varying degree of efficiency. This is evident from the diagrams in FIGS. 6a and 6b. The diagram in FIG. 6a is identical with that in FIG. 5a. The slopes A"–B" and C"–D" extend more steeply than the corresponding graphs in FIG. 6a. Since however the opening time A"–B" is also equal to the closing time C"–D" and the same exposure time is given as in graph FIG. 6a, then the effective time $t_2$ also corresponds to the effective time $t_2$, i.e. with a certain predetermined exposure time $t_1$ the effective times are independent of the efficiency of the diaphragm shutter and are also identical with one another. Finally, the two graphs in FIGS 5b and 6b also show that a reduction of the opening time A–B to A'–B' or A"–B" by reducing the aperture or by improving the efficiency, leads to an extension of the open time, so that in both cases, with the same setting time $t_1$ the effective exposure times are also equal.

I claim:
1. A photographic camera diaphragm shutter with an aperture setting member adapted to be set by hand to preselected aperture values, the shutter blades normally covering the lens opening swinging out to an opening width corresponding to the preselected aperture value, comprising a plurality of pivoted shutter blades, a permanent magnet operatively attached thereto, a two-pole electromagnet with its poles on opposite sides of one pole of said permanent magnet and limiting the movement of said pole, an electronic switching circuit energizing said electromagnet in either a forward or a reverse sense, delay means in said circuit for determining a shutter opening time, and means to determine the degree of separation of the said pole pieces of said electromagnet.

2. A shutter as recited in claim 1, comprising means interconnecting at least one of said pole pieces with said aperture setting member to determine the opening distance of said shutter blades during an exposure.

3. A shutter as recited in claim 1, in which said electromagnet has two pole pieces one of which is formed as a displaceable yoke, said pole pieces co-operating with said permanent magnet to move said shutter blades from closed to open to closed positions when said electromagnet is energised.

4. A shutter as recited in claim 1 in which said electromagnet has a pole piece formed as a displaceable yoke, with means interconnecting said pole piece with said aperture setting means to move said pole piece in accordance with movement of said setting member to a position corresponding to the selected aperture setting, said one pole of said permanent magnet being held against alternate poles of said electromagnet in the open and closed positions of said shutter blades.

5. A photographic camera diaphragm shutter comprising an aperture setting member, an exposure time setting member, a plurality of shutter blades, a permanent magnet operatively connected to said blades, a two-pole electromagnet, a movable pole piece on said electromagnet, said poles of said electromagnet being located so as to define a path over which said permanent magnet travels to open and close said shutter blades, means interconnecting said aperture setting member and said movable polepiece to determine the position of said pole piece; an electronic timing circuit, means interconnecting an element of said circuit with said exposure time setting member to determine the time delay of said circuit, and connections between said timing circuit and said electromagnet to energise said electromagnet in one sense to open said shutter blades and to energise said electromagnet in the other sense to close said shutter blades.

6. A shutter as recited in claim 5 in which said electronic timing circuit comprises a switch, means for operating said switch by a shutter release mechanism, and connections from said switch to said electromagnet and to a resistance-capacitance time delay device in said timing circuit.

References Cited

UNITED STATES PATENTS 2,999,445   9/1961   Fahlenberg _____ 95—63

JOHN M. HORAN, *Primary Examiner.*